(12) United States Patent
Thielman et al.

(10) Patent No.: US 7,788,048 B2
(45) Date of Patent: Aug. 31, 2010

(54) APPARATUS AND METHOD FOR INTEGRATING A FUEL SUPPLY AND A FUEL LEVEL SENSING PRESSURE SENSOR

(75) Inventors: Jeffrey L. Thielman, Corvallis, OR (US); Rhonda L. Wilson, Monmouth, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1409 days.

(21) Appl. No.: 10/423,161

(22) Filed: Apr. 24, 2003

(65) Prior Publication Data
US 2004/0215407 A1    Oct. 28, 2004

(51) Int. Cl.
 *G01L 7/00* (2006.01)
(52) U.S. Cl. ...................................................... 702/55
(58) Field of Classification Search .................... 702/55, 702/50, 138, 140; 429/13, 17, 22; 73/115, 73/119 A, 700, 714, 756
See application file for complete search history.

(56) References Cited

U.S. PATENT DOCUMENTS

| | | | | |
|---|---|---|---|---|
| 3,473,386 A | * | 10/1969 | Nielsen, Jr. et al. | 73/726 |
| 4,483,178 A | * | 11/1984 | Miille | 73/708 |
| 4,553,216 A | * | 11/1985 | Stevens et al. | 702/55 |
| 4,682,293 A | * | 7/1987 | Goldenberg et al. | 701/104 |
| 4,696,165 A | * | 9/1987 | Bucher | 60/609 |
| 4,739,494 A | * | 4/1988 | Torii | 702/173 |
| 5,047,298 A | * | 9/1991 | Perry, Jr. et al. | 429/17 |
| 5,111,201 A | * | 5/1992 | Matsumura et al. | 340/870.38 |
| 5,257,547 A | * | 11/1993 | Boyer | 73/756 |
| 5,628,349 A | | 5/1997 | Diggins et al. | |
| 5,708,424 A | * | 1/1998 | Orlando et al. | 340/870.08 |
| 5,809,771 A | * | 9/1998 | Wernberg | 60/39.094 |
| 5,867,031 A | * | 2/1999 | Wang | 324/721 |
| 5,970,786 A | | 10/1999 | Smith et al. | |
| 6,041,762 A | | 3/2000 | Sirosh et al. | |
| 6,068,672 A | * | 5/2000 | Watson et al. | 44/629 |
| 6,184,656 B1 | * | 2/2001 | Karunasiri et al. | 320/119 |
| 6,294,276 B1 | * | 9/2001 | Ogino | 429/17 |
| 6,318,615 B1 | * | 11/2001 | Walter | 227/10 |
| 6,326,097 B1 | | 12/2001 | Hockaday | |
| 6,357,288 B1 | * | 3/2002 | Shigihama et al. | 73/118.1 |
| 6,405,744 B1 | * | 6/2002 | LaPant | 137/1 |
| 6,435,638 B1 | | 8/2002 | Wilson et al. | |
| 6,454,375 B2 | | 9/2002 | Wilson et al. | |
| 6,459,995 B1 | * | 10/2002 | Collister | 702/23 |

(Continued)

FOREIGN PATENT DOCUMENTS

| | | | |
|---|---|---|---|
| DE | 101 10 649 A1 | * | 9/2002 |
| EP | 1201437 | | 5/2002 |
| JP | 58087770 A | * | 5/1983 |
| JP | 2001313047 A | * | 11/2001 |
| WO | WO 02/1101336 | * | 12/2002 |

OTHER PUBLICATIONS

Merriam-Webster Online Dictionary, cartridge—Definition, p. 1, Apr. 28, 2009.*

(Continued)

*Primary Examiner*—Tung S Lau

(57) ABSTRACT

A fuel supply includes a fuel container having an interior chamber for containing fuel, and a pressure sensing unit disposed within the interior chamber of the fuel container. The pressure sensing unit is configured to provide an output signal indicative of an amount of fuel remaining in the fuel container.

29 Claims, 13 Drawing Sheets

U.S. PATENT DOCUMENTS

| | | | |
|---|---|---|---|
| 6,463,965 | B1 | 10/2002 | Rasche et al. |
| 6,467,861 | B1 | 10/2002 | Thielman et al. |
| 6,738,697 | B2 * | 5/2004 | Breed ................... 701/29 |
| 6,993,966 | B2 * | 2/2006 | Stenmark ............. 73/290 B |
| 2002/0011094 | A1 * | 1/2002 | Cook et al. ............ 73/49.2 |
| 2003/0010115 | A1 | 1/2003 | Kelley et al. |
| 2003/0070487 | A1 * | 4/2003 | DaCosta et al. .......... 73/708 |
| 2003/0177823 | A1 * | 9/2003 | Schoeffel et al. ....... 73/118.2 |
| 2003/0230289 | A1 * | 12/2003 | Yamaoka et al. ......... 123/529 |
| 2004/0062963 | A1 * | 4/2004 | Umayahara et al. ......... 429/22 |
| 2004/0072049 | A1 * | 4/2004 | Becerra et al. ............ 429/34 |
| 2004/0079150 | A1 * | 4/2004 | Breed et al. ............... 73/291 |
| 2005/0014041 | A1 * | 1/2005 | Becerra et al. ............ 429/22 |
| 2005/0192727 | A1 * | 9/2005 | Shostak et al. ............ 701/37 |

OTHER PUBLICATIONS http://www.merriam-webster.com/dictionary/inert, p. 1, Feb. 2, 1010.* http://www.merriam-webster.com/dictionary/pressure, p. 1, Feb. 2, 2010.* http://www.merriam-webster.com/dictionary/propellant, p. 1, Feb. 2, 2010.*

* cited by examiner

APPARATUS AND METHOD FOR INTEGRATING A FUEL SUPPLY AND A FUEL LEVEL SENSING PRESSURE SENSOR

BACKGROUND

During the past several years, the popularity and viability of fuel cells for producing large and small amounts of electricity has increased significantly. Fuel cells conduct an electrochemical reaction with chemicals such as hydrogen and oxygen to produce electricity and heat. Some fuel cells are similar to batteries but can be "recharged" while still providing power. Fuel cells are also much cooler and cleaner than electric generators that burn hydrocarbons.

Fuel cells provide a DC (direct current) voltage that may be used to power motors, lights, computers, or any number of electrical appliances. There are several different types of fuel cells, each using a different chemistry. Fuel cells are usually classified by the type of electrolyte used. Fuel cell types are generally categorized into one of five groups: proton exchange membrane (PEM) fuel cells, alkaline fuel cells (AFC), phosphoric-acid fuel cells (PAFC), solid oxide fuel cells (SOFC), and molten carbonate fuel cells (MCFC).

Each of the fuel cells mentioned above uses oxygen and hydrogen to produce electricity. Ambient air typically supplies the oxygen for a fuel cell. In fact, for the PEM fuel cell, ordinary air may be pumped directly into the cathode. However, hydrogen is not as readily available as oxygen. Hydrogen is difficult to generate, store, and distribute for a number of reasons including high flammability. Thus, strict safety precautions must be taken in order to reduce potential hazards.

One common method for producing hydrogen for fuel cells is through the use of a reformer. A reformer is fed hydrocarbons or other fuels that produce hydrogen. The hydrogen produced by the reformer can then be fed to the fuel cell where that hydrogen reacts with oxygen or another oxidant to produce the desired electricity. The use of a reformer allows for the production of electricity using propane, butane, or a number of other readily accessible natural gases as the hydrogen fuel source.

These natural gasses are typically stored in a container at a high vapor pressure (greater than 1 atmosphere partial pressure) or low vapor pressure (less than 1 atmosphere partial pressure) and are accessed when hydrogen is required by the system. While the storage of the hydrocarbons has traditionally been fairly simple, it has traditionally been difficult to predict the level of fuel remaining in a pressurized container.

One previous method for determining the remaining amount of fuel in a pressurized container involved estimating the amount of fuel that has passed from the pressurized container into the reformer. The estimated amount of fuel is then subtracted from the container capacity to determine the likely amount of remaining fuel and subsequently, the amount of time an automobile or other device incorporating the fuel cell could function before refueling. While this method was generally useful, it was expensive to implement and was not sufficiently accurate for sources requiring precise fuel level information.

An additional previous method for determining the remaining amount of fuel in a pressurized container involved routing both fuel and pressurized air to a number of pressure sensors to establish a differential pressure signal. The pressure difference between the fuel and the pressurized air could be used to predict low fuel conditions. However, in order to supply the fuel and the pressurized air to the pressure sensors, at least two fluid interconnects had to be routed to the fuel supply. These fluid interconnects significantly increased the cost of the fuel supply containers and increased the likelihood of fuel leaks due to an insufficient seal on one or more of the interconnects.

SUMMARY

A fuel supply includes a fuel container having an interior chamber for containing fuel, and a pressure sensing unit disposed within the interior chamber of the fuel container. The pressure sensing unit is configured to provide an output signal indicative of an amount of fuel remaining in the fuel container.

BRIEF DESCRIPTION OF THE DRAWINGS

The accompanying drawings illustrate various embodiments of the present invention and are a part of the specification. The illustrated embodiments are merely examples of the present invention and do not limit the scope of the invention.

Throughout the drawings, identical reference numbers designate similar, but not necessarily identical, elements.

DETAILED DESCRIPTION

An apparatus and method for integrating a fuel supply and a fuel level sensor are described herein. The fuel supply and fuel level sensor may be used to provide a reactant to a fuel cell. According to one exemplary implementation, described more fully below, a fuel supply and a fuel level sensor are integrated such that the fuel level sensor is located inside the fuel supply to provide a user with an accurate estimation of the remaining fuel within the fuel supply based on an internal pressure measurement while simultaneously reducing the likelihood of fuel leaks.

In the following description, for purposes of explanation, numerous specific details are set forth in order to provide a thorough understanding of the invention. It will be apparent, however, to one skilled in the art that the invention may be practiced without these specific details. Reference in the specification to "one embodiment" or "an embodiment" means that a particular feature, structure, or characteristic described in connection with the embodiment is included in at least one embodiment of the invention. The appearance of the phrase "in one embodiment" in various places in the specification are not necessarily all referring to the same embodiment.

Exemplary Structure

Figure 1:
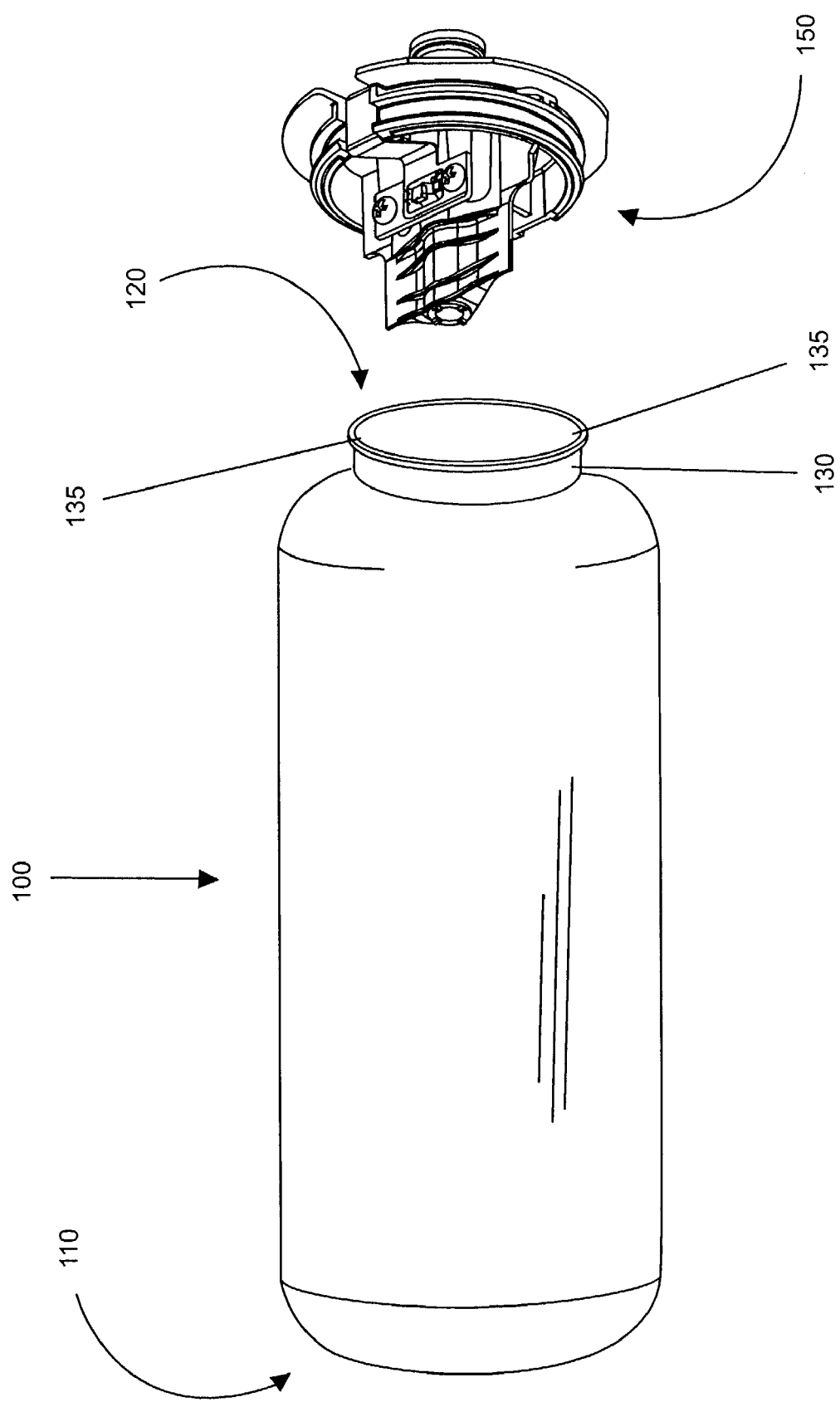
FIG. 1 illustrates the components of a hydrocarbon fuel supply according to one exemplary embodiment.

FIG. 1 illustrates an exemplary embodiment of a fuel source capable of providing pressurized hydrocarbons to a fuel requiring system while providing a user with an accurate evaluation of the remaining supply of pressurized fuel contained within the fuel source. As shown in FIG. 1, the present fuel source may include both a fuel container (100) and a fuel supply connection and monitoring unit (150). The fuel container (100) may either be integrally formed with the fuel supply connection and monitoring unit (150), or alternatively, both the fuel container (100) and the fuel supply connection and monitoring unit (150) may be separate and distinct units capable of being formed at different locations and later fluidly coupled.

The fuel container (100) of the embodiment illustrated in FIG. 1 may be any shape but is preferably a cylindrically-shaped fuel container (100) including a cavity (not shown) formed in such a way as to contain pressurized hydrocarbons, such as propane or butane, or other fuels. The fuel container (100) is formed with a body having a distal (110) and a proximal (120) end. The proximal (120) end of the fuel container (100) includes a mechanism for fluidly coupling the fuel container (100) to a fuel supply connection and monitoring unit (150). The fuel container (100) may be fluidly coupled to the fuel supply connection and monitoring unit (150) using any number of coupling mechanisms including, but in no way limited to a threaded connection, adhesives, an interference fit, or any number of mechanical devices such as screws, rivets, brads, or a metal crimp ring. A metal crimp ring may be selected due to the low cost to manufacture and implement. An upper coupling ridge (135) is formed around a mouth (130) of the fuel container (100). The upper coupling ridge (135) of on the fuel container (100) may receive the metal crimp ring thereby forming the fluid couple.

Figure 2A:
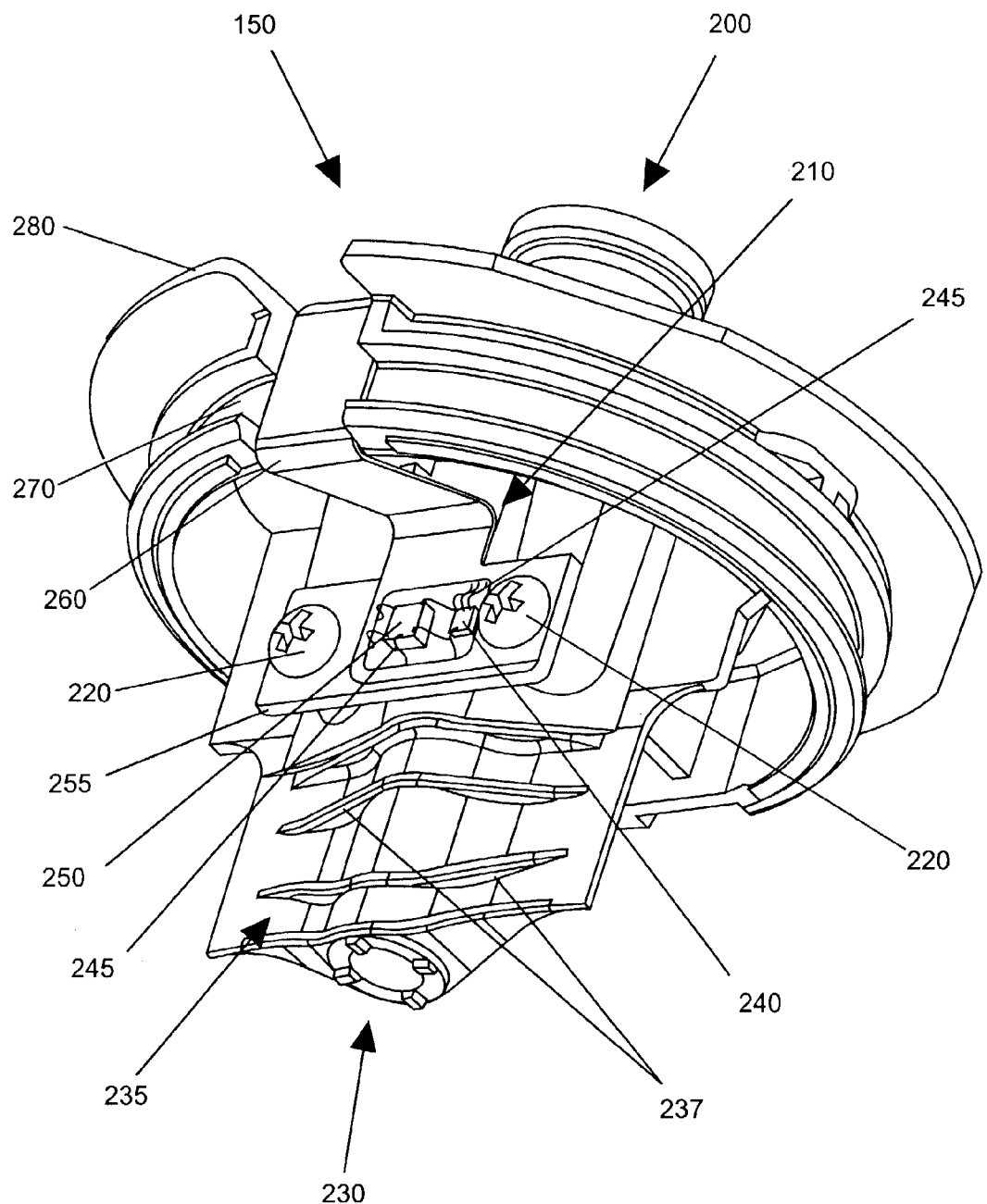
FIG. 2A illustrates a hydrocarbon fuel supply connection and monitor unit according to one exemplary embodiment.

The components of a fuel supply connection and monitoring unit (150) that may be fluidly coupled to the proximal end (120) of the fuel container (100) are further illustrated in FIG. 2A. According to the embodiment illustrated in FIG. 2A, the fuel supply connection and monitoring unit (150) includes a system coupling extrusion (200), a coupling ridge (280), an gasket receiving groove (270), an exit lumen (230), and a pressure sensing unit (210) coupled to the fuel supply connection and monitoring unit (150) in such a way that the pressure sensing unit (210) is positioned within the fuel container (100; FIG. 1) where it may be in contact with the fuel supply.

In the embodiment illustrated in FIG. 2A, the system coupling extrusion (200) is an extrusion capable of being received and fluidly coupled to a fuel requiring system. The system coupling extrusion (200) may be either a male or a female type coupling that may be fluidly coupled to a fuel requiring system. The internal components of the system connection extrusion are further explained below with reference to FIGS. 5 and 6.

The exit lumen (230) illustrated in FIG. 2A provides a fluid passage for the escape of any pressurized fuel contained within the pressurized fuel tank through the exit orifice and to any subsequent fuel consuming system or device. The exit lumen (230) begins on the fuel side of the fuel supply connection and monitoring unit (150) and extends throughout the body of the fuel supply connection and monitoring unit (150) exiting through the end of the system coupling extrusion (200). This configuration allows for the transfer of fuel from inside the fuel container (100; FIG. 1) through the fuel supply connection and monitoring unit (150) to any external system that is coupled to the system coupling extrusion (200). According to the embodiment illustrated in FIG. 2A, the cavity formed by the exit lumen (230) comprises a circular cross-section. However, it is certainly possible for the exit lumen (230) to have any cross-sectional shape.

Figure 6:
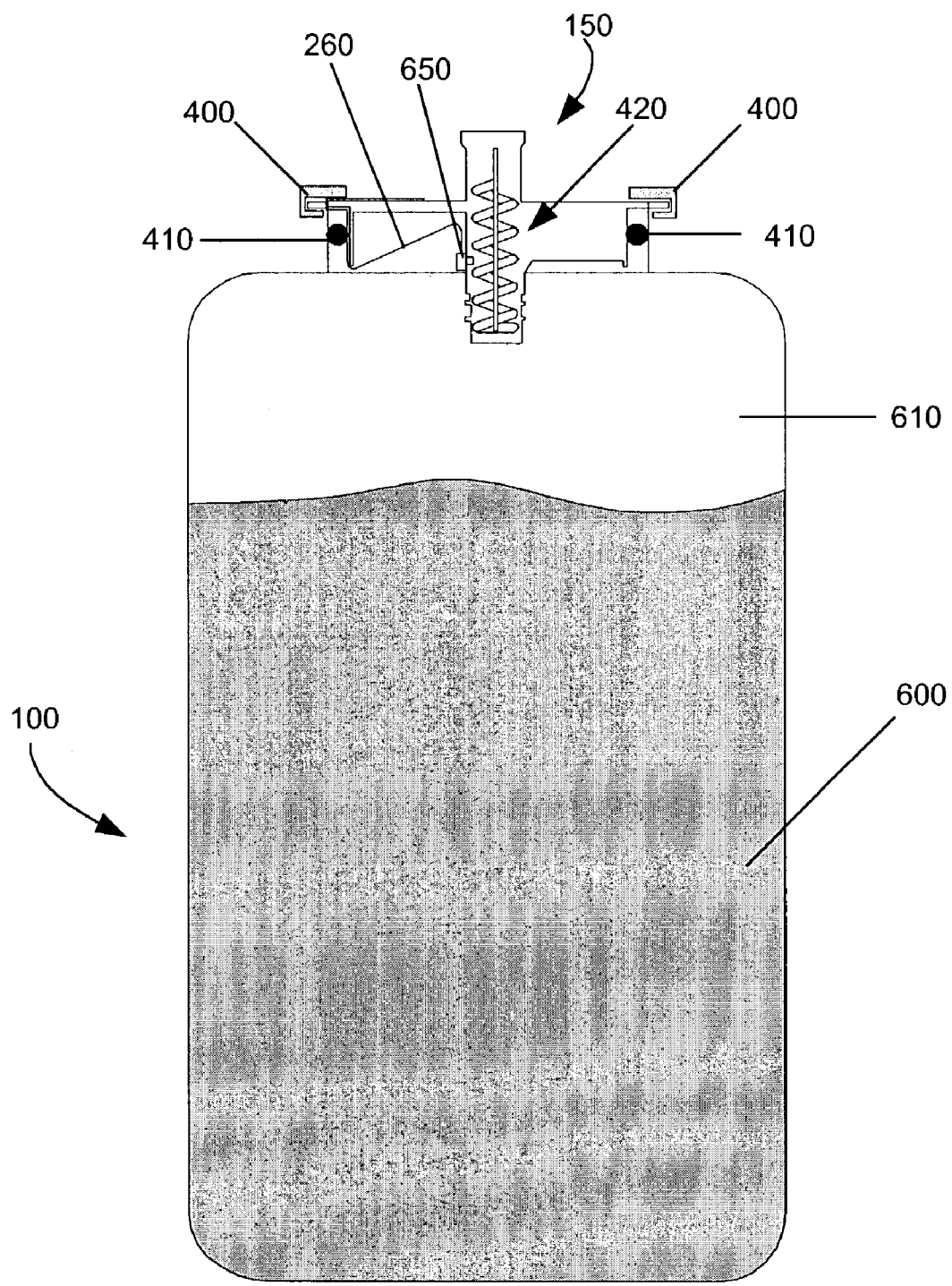
FIG. 6 illustrates a hydrocarbon fuel supply connection and monitor unit connected to an alternative fuel supply according to one exemplary embodiment.

The material surrounding the exit lumen (230) forms a staking keel (235). The staking keel (235) includes laterally extruding material forming the exit lumen (230) that may include a number of ridges (237). A fuel bag (630; FIG. 6) may be attached to the staking keel (235) thereby providing fuel to the exit lumen (230) while preventing the leakage of any fuel outside of the fuel bag. The fuel bag may be attached to the staking keel (235) by any number of securing mechanisms including but in no way limited to external compression seals between the ridges (237), adhesives, or any number of mechanical fasteners. The fuel bag (630; FIG. 6) may be attached to the staking keel (235) through a heat staking process in which both heat and pressure are applied to a fuel bag (630; FIG. 6) which includes an innermost layer made substantially of polyethylene or another heat stakeable material. When the heat and pressure are applied, the ridges (237) and the innermost layer of the fuel bag (630; FIG. 6) partially melt together forming a fluid tight seal.

Figure 5:
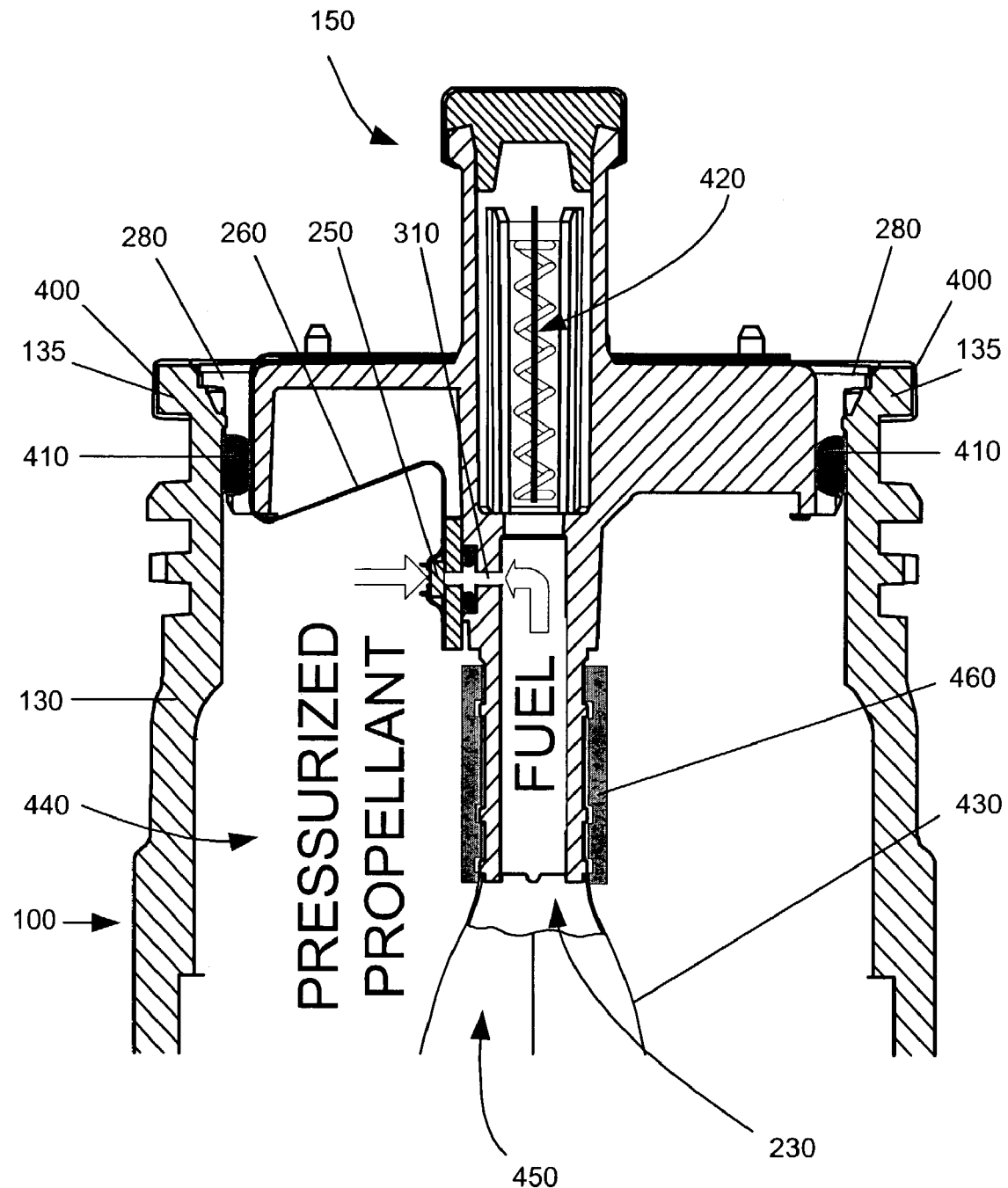
FIG. 5 is a cross-sectional view illustrating the internal components and function of a hydrocarbon fuel supply according to one exemplary embodiment.

The coupling ridge (280) of the fuel supply connection and monitoring unit (150) is a lip that may be connected to the proximal end of a pressurized fuel container by the use of a metal crimp ring (400; FIG. 5). However, the fuel supply connection and monitoring unit (150) may be connected to the proximal end (120) of a pressurized fuel container (100; FIG. 1) by any method sufficient to fluidly couple the pressurized fuel container and the fuel supply connection and monitoring unit (150). The coupling method may include, but is in no way limited to, a snap ring, threads, a compression fitting, adhesives, an interference fit, or any number of mechanical fasteners.

Figure 4:
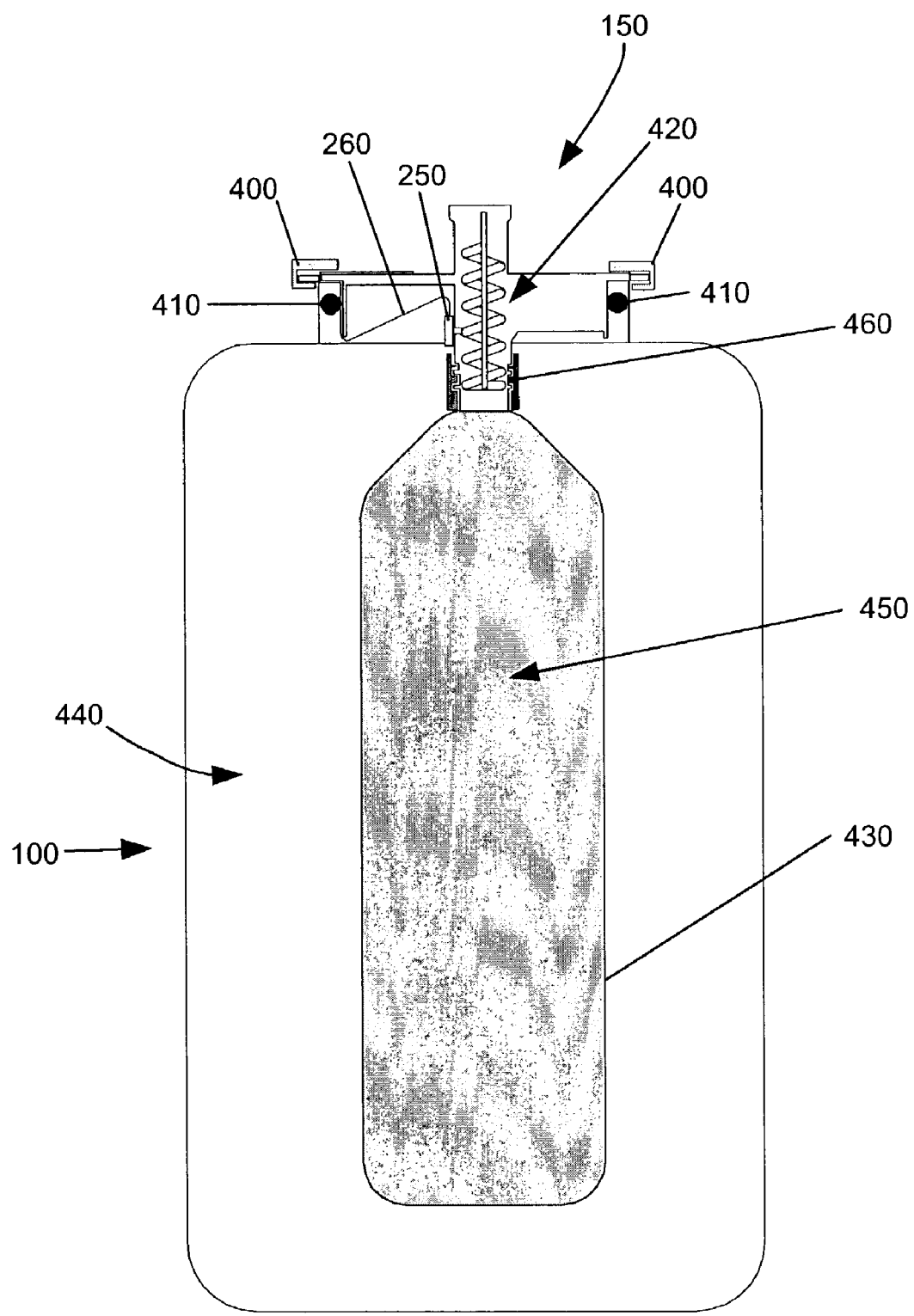
FIG. 4 is a cross-sectional view illustrating the internal components of a hydrocarbon fuel supply according to one exemplary embodiment.

The fluid couple between the pressurized fuel container (100; FIG. 1) and the fuel supply connection and monitoring unit (150) may be further assured by the use of an o-ring (410; FIG. 4) or other gasket type sealer that will form a compression fit between the inner wall of the proximal end (120) of the pressurized tank (100; FIG. 1) and the gasket receiving groove (270). The gasket receiving groove (270) provides both a location and support for the seating of an o-ring, a square cross-section gasket, or another sealing device that forms a fluid seal between the fuel container (100; FIG. 1) and the fuel supply connection and monitoring unit (150).

Figure 3:
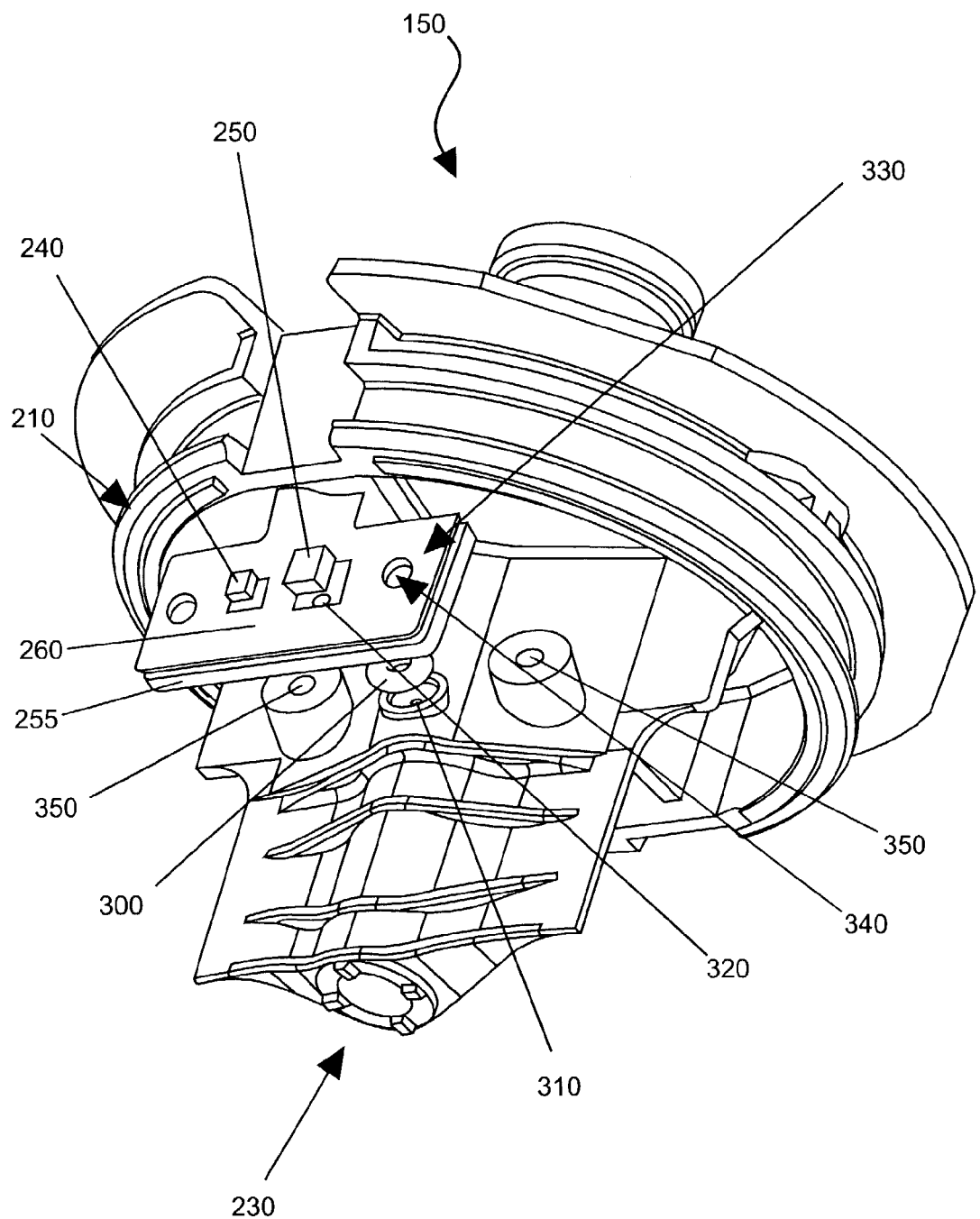
FIG. 3 is an exploded view illustrating the connection components of a hydrocarbon fuel supply connection and monitor unit according to one exemplary embodiment.

The pressure sensing unit (210) and its associated assembly illustrated in FIG. 2A may perform and transmit a number of pressure measurements corresponding to the fuel contained in the pressurized fuel container (100; FIG. 1). The pressure sensing unit (210) is may be secured to the fuel supply connection and monitoring unit (150) by a number of plastic screws (220) that are received by fastener receiving orifices (350; FIG. 3) formed in the body of the fuel supply connection and monitoring unit (150) just above the staking keel (235). The pressure sensing unit (210) may be secured to the fuel supply connection and monitoring unit (150) by any mechanism capable of sufficiently supporting the pressure sensing unit (210) while maintaining pressure necessary for a fluid seal including, but in no way limited to, mechanical fasteners such as screws, rivets, nails, or brads; adhesives; pre-formed tabs that provide an interference fit; etc. In one embodiment, the fasteners used to secure the pressure sensing unit (210) to the fuel supply connection and monitoring unit (150) are metal thread-forming screws.

In the embodiment illustrated in FIG. 2A, the pressure sensing unit (210) includes a memory unit (240), wire bonds (245), a pressure sensor (250), and a flexible circuit (260) secured to a rigid substrate (255). The flexible circuit (260) may be secured to the rigid substrate (255) by an adhesive. The rigid substrate (255) provides stability to the flexible circuit (260) preventing any flexing by the circuit (260) that may interfere with pressure measurements taken by the pressure sensor (250). The rigid substrate (255) may be manufactured of any material that has a substantially low coefficient of thermal expansion thereby preventing the transmission of temperature related stresses to the pressure sensor (250). Possible materials include, but are in no way limited to, ceramic, metal, or plastic. In one embodiment, the rigid substrate (255) is a ceramic substrate such as alumina due to its low coefficient of thermal expansion, high chemical resistance, compatibility with numerous adhesives, and creep resistance.

The pressure sensor (250) of the pressure sensing unit (210) may be either a differential pressure transducer or an absolute pressure transducer that provides an output when there is a change in the relative or absolute pressure acting upon the pressure sensing unit (210). A memory unit (240) is also coupled to the rigid substrate (255). The memory unit (240) of the pressure sensing unit (210) may be any memory storage device capable of storing the pressure data collected by the pressure sensor (250). The memory unit (240) may also store calibration data or pressure/volume characteristics.

The flexible circuit (260) illustrated in FIG. 2A is preferably a printed circuit substrate including conductive leads (not shown). Both the pressure sensor (250) and the memory unit (240) may be connected to the conductive leads (not shown) of the flexible circuit (260) using wire bonds (245). The wire bonds (245) may be made out of gold, aluminum, or some other appropriately conductive material. The wire bonds communicatively couple the memory unit (240) and the pressure sensor (250) to the flexible circuit (260). The flexible circuit (260) extends from the rigid substrate (255), across the gasket receiving groove (270) and onto the top of the fuel supply connection and monitoring unit (150) outside of the fuel container (100; FIG. 1). By passing the flexible circuit (260) across the gasket receiving groove (270) as illustrated in FIG. 2A, the flexible circuit (260) is sealed by the compression exerted by the o-ring (610; FIG. 6) or other type gasket and no fuel is allowed to escape.

Figure 2B:
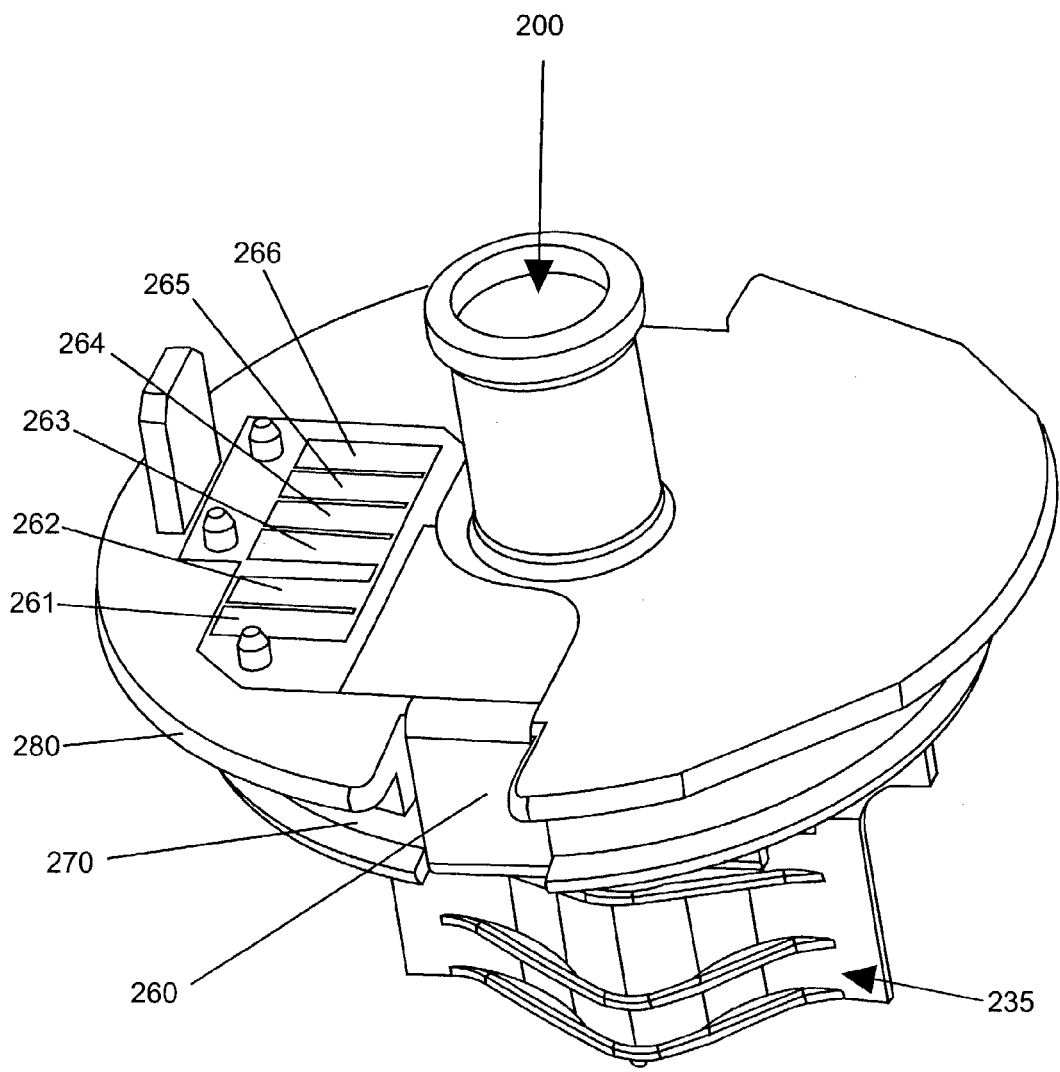
FIG. 2B illustrates an alternative view of a hydrocarbon fuel supply connection and monitor unit according to one exemplary embodiment.

FIG. 2B further illustrates the components of the pressure sensing unit (210). As shown in FIG. 2B, the pressure sensing unit (210) extends to the top of the fuel supply connection and monitoring unit (150). Located on the top of the fuel supply connection and monitoring unit (150) are a number of conductive contacts (261-266) disposed on the flexible circuit (260). The conductive contacts (261-266) are made of gold, tin or other conductive material and are communicatively coupled through the conductive leads of the flexible circuit (260) to the pressure sensor (250) and the memory unit (240).

Figure 11:
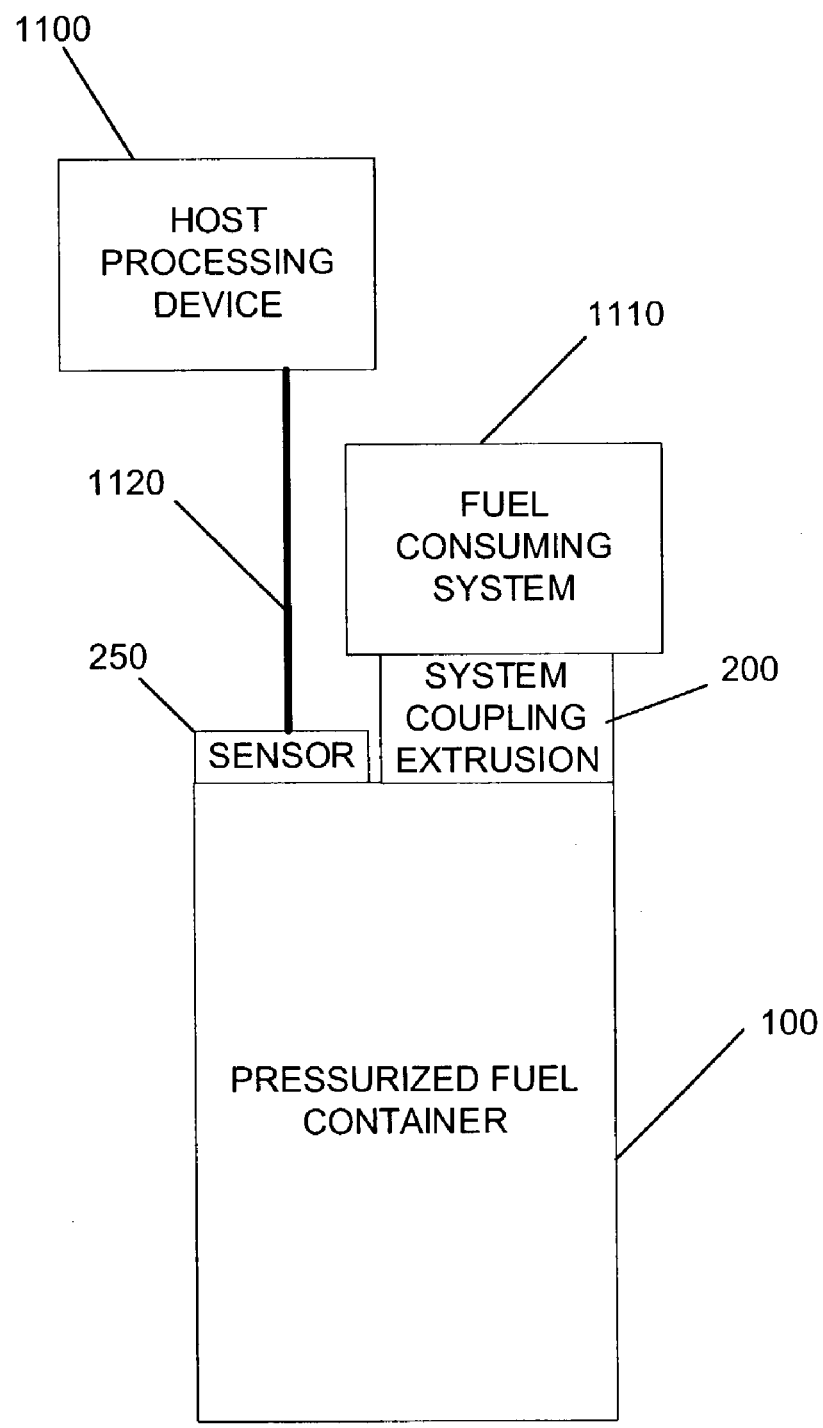
FIG. 11 illustrates a system connection of the present remote transmitting unit according to one exemplary embodiment.

In this manner the conductive contacts (261-266) act as an electrical connection between the pressure sensor (250; FIG. 2A) and memory unit (240; FIG. 2A) and a host device (1100; FIG. 11).

In the embodiment illustrated in FIG. 2B, the electrical connections include a ground (261) connection, a voltage at the common collector (Vcc) connection (262), a clock connection (263), a data connection (264), a Pressure out + (P out +) connection (265), and a Pressure out − (P out −) connection (266). The ground (261) and the Vcc (262) connections provide power to the pressure sensor (250; FIG. 2A) and the memory unit (240). The clock line (263) connection and the data line (264) connection provide a serial interface for the memory device. A serial interface is an interface that sends data one event at a time. According to one embodiment, the memory unit (240; FIG. 2A) may store and/or transmit data regarding the current fuel tank and/or information collected from the pressure sensor (250). The P out + (265) connection and the P out − (266) connection provide an out voltage corresponding to the different pressures measured by the pressure sensor (250; FIG. 2A) when utilized in a pressure differential capacity.

The conductive contacts (261-266) may be communicatively coupled to the host device (1100; FIG. 11) in a number of ways including, but in no way limited to, electrical leads that form a part of the system coupling unit, or leads that form a part of the fuel tank housing and are communicatively coupled to the host device.

FIG. 3 illustrates how the components of a pressure sensing unit (210) are arranged in a differential pressure measuring configuration. As illustrated in FIG. 3, the flexible circuit (260) is coupled to the rigid substrate (255) as previously mentioned. The exit lumen (230) that extends throughout the body of the fuel supply connection and monitoring unit (150) exiting through the system coupling extrusion (200) is fluidly coupled to the pressure sensor (250) through a pressure access lumen (310) and a substrate lumen (320). The substrate lumen (320) is a cavity that extends from the point of the rigid substrate (255) that is in contact with the pressure sensor (250) to the opposite side of the rigid substrate (255). On the opposite side of the rigid substrate (255), the substrate lumen (320) is fluidly coupled with the pressure access lumen (310). The pressure access lumen (310) extends from the rigid substrate (255) into the exit lumen (230). With this configuration, the pressure sensor (250) may measure the pressure of any fuel that is traveling through the exit lumen (230) en route to an external system. An o-ring (300) or other sealing device is also provided around the pressure access lumen (310) to form a seal between the rigid substrate (255) and the body of the fuel supply connection and monitoring unit (150). This o-ring (300) prevents any gas whose pressure is being measured by the pressure sensor (250) to escape into the non-fuel containing cavity of the pressurized fuel container (100; FIG. 1).

FIG. 3 also illustrates how the pressure sensing unit (210) is secured to the body of the fuel supply connection and monitoring unit (150). The body of the fuel supply connection and monitoring unit (150) comprises a number of fastener receiving orifices (350). Corresponding to the locations of the fastener receiving orifices (350) are orifices on both the rigid substrate (340) and the flexible circuit (330). When the fastener receiving orifices (350) are concentric with the orifices of the rigid substrate (340) and the flexible circuit (330), a screw or other fastening devices may pass through the orifices (330-350) and secure the pressure sensing unit (210) to the body of the fuel supply connection and monitoring unit (150).

Moreover, FIG. 3 illustrates that the memory unit (240) and the pressure sensor (250) may be secured directly to the rigid substrate (255) using any number of adhesives.

FIG. 4 is a cross-sectional illustration of the present fuel supply connection and monitoring unit (150) in its assembled state when measuring differential pressure. As illustrated in FIG. 4, the fuel container (100) is coupled to the fuel supply connection and monitoring unit (150). The fuel container (100) and the fuel supply connection and monitoring unit (150) illustrated in FIG. 4 are mechanically coupled using a metal crimp ring (400). Any number of coupling mechanisms may be used to couple the fuel container (100) and the fuel supply connection and monitoring unit (150) including, but in no way limited to a threaded connection, adhesives, an interference fit, or any number of mechanical devices such as screws, rivets, brads, or a metal crimp ring. With the fuel supply connection and monitoring unit (150) coupled in place, one or more o-rings (410), square cross-section gaskets, or other gasket type sealers are compressed and form a compression fit between the inner or upper wall of the proximal end (120; FIG. 1) of the pressurized tank (100) and the gasket receiving groove (270; FIG. 2A) of the fuel supply connection and monitoring unit (150). This compression fit prevents any fuel or propellant from escaping the pressurized tank (100).

FIG. 4 also illustrates a fuel bag (430) containing fuel (450) that is fluidly coupled to the fuel supply connection and monitoring unit (150) by a fitment (460). The fitment (460) may be a fitting that fluidly seals the fuel bag (430) to the fuel supply connection and monitoring unit (150), including, but in no way limited to a compression fitting. Between the fuel bag (430) and the pressurized tank is a propellant gas or liquid (440). The fitment (460) prevents any fuel (450) from escaping the fuel bag (430) and mixing with the propellant (440). Between the fuel (450) located in the fuel bag (430) and the fuel requiring system (not shown) is a valve (420). The valve (420) forms a portion of the coupling extrusion (200; FIG. 2A) of the fuel supply connection and monitoring unit (150). The valve (420) of the fuel supply connection and monitoring unit (150) is used to regulate the release of the fuel (450) from the fuel bag (430) into a fuel system. The valve (420) illustrated in FIG. 3 is a Schrader style valve, however, any valve capable of regulating the emission of pressurized fuels may be incorporated with the present fuel supply connection and monitoring unit (150).

FIG. 11 illustrates the system connection of a fuel supply connection and monitoring unit (150) according to one exemplary embodiment. As shown in FIG. 11, the conductive contacts of the pressure sensor (250) are communicatively coupled to a host processing device (1100) through an electrical coupler (1120). Moreover, FIG. 11 illustrates the system coupling extrusion (200) directly coupled to the fuel requiring system (1110). The processing device (1100) communicatively coupled to the pressure sensor (250) may include, but is in no way limited to an application specific integrated circuit (ASIC), or other processing device. The electrical coupler (1120) that communicatively couples the host processing device (1100) and the conductive contacts of the pressure sensor (250) may include, but is in no way limited to, a single insulated conductor, a serial cable, or a wireless communication technology.

Exemplary Implementation and Operation

FIG. 5 illustrates the proper operation of one exemplary embodiment of a fuel supply connection and monitoring unit (150) when properly connected to a fuel requiring system. As shown in FIG. 5, fuel (450) is contained within the internal cavity of a fuel bag (430) with pressurized propellant (440) filling the remainder of the internal cavity formed by the pressurized tank (100). When the fuel supply connection and monitoring unit (150) is coupled to the pressurized tank (100), the valve (420) of the fuel supply connection and monitoring unit (150) is not compressed and no fuel (440) is allowed to escape. However, a fluid tight seal is formed between the coupling ridge (280) of the fuel supply connection and monitoring unit (150) and the upper coupling ridge (135) of the pressurized tank (100). The pressurized tank (100) and the fuel supply connection and monitoring unit (150) may be coupled, pressurized, and stored together for large periods of time without leaking or otherwise releasing fuel.

When the fuel supply connection and monitoring unit (150) is coupled to a fuel requiring system, a valve actuator (not shown) of the fuel requiring system coupler enters the system coupling extrusion (200; FIG. 2A) and compresses the valve (420). Once the valve (420) of the fuel supply connection and monitoring unit (150) is compressed, the fuel (450) contained in the fuel bag (430) is allowed to escape and supply fuel to the fuel requiring system.

As illustrated in FIG. 5, a pressurized propellant (440) may be supplied to fill the cavity of the pressurized tank (100) and provide pressure to the fuel bag (430) causing the fuel (450) in the fuel bag (430) to be expended. The pressurized propellant (440) may be any inert gas that may be pressurized sufficiently to expend the fuel (450). According to this exemplary embodiment, the fuel (450) contained in the fuel bag (430) is methanol, pentane, hexane, or another low vapor pressure liquid fuel. As the fuel (450) in the fuel bag (430) is expended, the pressure of the pressurized propellant (440) decreases according to the Ideal Gas Law.

Figure 8A:
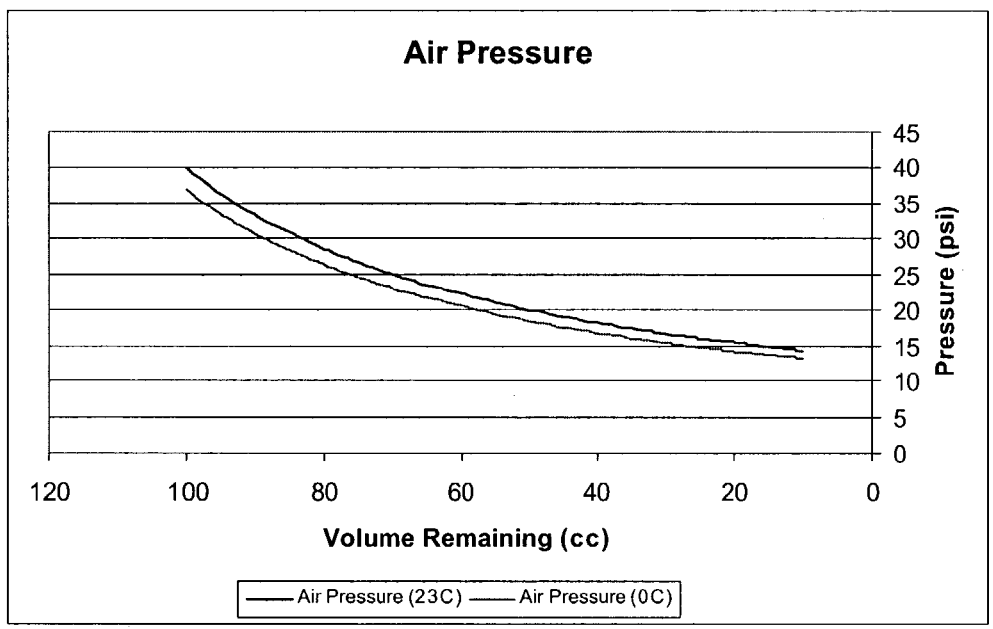
FIGS. 8A and 8B illustrate typical relationships between the internal pressure and the volume of fuel remaining in a fuel container according to exemplary embodiments.

FIG. 8A illustrates how the pressure of the inert propellant (440; FIG. 5) will decrease as the fuel (450) contained in the fuel bag (430) is expended. Returning again to FIG. 5, when the valve (420) is actuated by a system coupling device and the fuel (450) is allowed to escape and pressurize the fuel requiring system, the fuel (450) enters into the exit lumen (230). The exiting fuel (450) not only pressurizes the exit lumen (230) but also pressurizes the pressure access lumen (310) and exerts a pressure on the pressure sensor (250). With the exiting fuel (450) exerting pressure on one side of the pressure sensor (250) and the inert propellant (440) exerting pressure on the other side of the pressure sensor (250), the pressure sensor is able to transmit voltages representing the differential pressure through the flexible circuit (260) to the conductive contacts (261-266; FIG. 2B). The voltages representing the differential pressure being exerted on the pressure sensor (250) may then be transmitted to a host processing device (1100; FIG. 11). The host processing device (1100; FIG. 11) may contain instructions, which when accessed, convert the voltages representing the differential pressure exerted on the pressure sensor (250) to a fuel level display using the pressure/volume characteristics illustrated in FIG. 8A. The fuel level may then be reported to the system user. This fuel level computation may be determined continuously so that the system user may be continuously informed of the fuel level contained within the fuel bag (430).

According to one embodiment, a memory device (240; FIG. 2A) is incorporated in the present fuel system to store sensor calibration and current fuel levels. By incorporating a memory device (240; FIG. 2A) a partially used fuel cell may be moved from one host system to another. Once moved, the memory device (240; FIG. 2A) may then communicate to the host processing device (1100; FIG. 11) the sensor calibration, the differential pressure, and subsequently the current fuel level. Alternatively, if the memory device (240; FIG. 2A) is not required because the pressurized tank (100) may not be moved from one fuel requiring system to another, the fuel level information may be stored in the memory of the host processing device (1100; FIG. 11) to save cost in manufacturing the fuel cell. Additional data may be stored in the memory device (240; FIG. 2A) including, but in no way limited to, a freshness date, warranty data, usage data, and temperature compensation values.

Figure 8B:
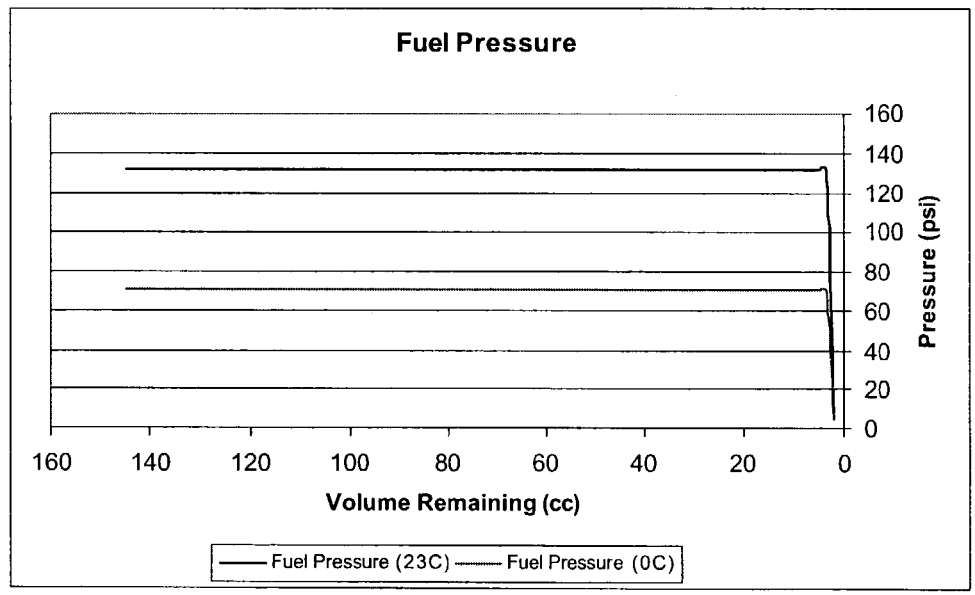

If an organic propellant such as propane, iso-butane, or iso-pentane (2-Methylbutane) is used, rather than an inert gas, as the pressurized propellant (440) in the embodiment of the fuel supply illustrated in FIG. 5, the fuel (450) in the fuel bag (430) may exhibit a fairly constant pressure throughout the life of the fuel supply. FIG. 8B illustrates a typical pressure/ volume characteristic for this embodiment. As shown in FIG. 8B, the fuel (450) exhibits a fairly constant pressure for a majority of the fuel life. Once a majority of the fuel (450) has been supplied to the fuel requiring system and the fuel bag begins to collapse, an additional loss in pressure will occur. This loss in pressure may be measured by the differential pressure sensor (250) allowing for the monitoring of the fuel level for approximately the final 5-20% of the fuel supply life. The portion of the fuel level that may be measured by the differential pressure sensor (250) according to this embodiment depends on the specific design of the fuel bag (430), the type of propellant used, as well as other factors. The previously used methods of calculating the fuel flow and subtracting the flow from the total may be used to estimate the loss in fuel while the pressure is substantially constant. The measurements taken by the differential pressure sensor (250) as well as the known pressure/volume characteristics are then implemented once the pressure begins to drop, to determine the remaining fuel levels in the fuel tank (100).

ALTERNATIVE EMBODIMENTS

According to one alternative embodiment, illustrated in FIG. 6, an absolute pressure transducer (650) may be used to sense pressure changes from within a pressurized tank (100) without the use of a fuel bag (430; FIG. 4). As illustrated in FIG. 6, a low vapor pressure fuel (600) such as methanol, pentane, or hexane fills the internal cavity of the pressurized fuel tank (100). The low vapor pressure fuel (600) is then pressurized by the addition of an inert propellant (610). The inert propellant (610) may be pumped into the pressurized fuel tank (100) to pressurize the low vapor pressure fuel (600). When the fuel tank (100) is coupled to a fuel consuming system, the valve (420) of the fuel supply connection and monitoring unit (150) is compressed and the fuel (600) is allowed to escape into the fuel consuming system (1110; FIG. 11). As the fuel is dispensed into the fuel consuming system (1110; FIG. 11), the pressure/volume relationship illustrated in FIG. 8A occurs. Since the overall pressure inside the fuel tank (100) corresponds to a known fuel volume, the pressure data produced by the absolute pressure transducer (650) may be sent to a host processing device (1100; FIG. 11) where the pressure data is converted into a fuel level that may then be reported to the system user. Since the absolute pressure transducer (650) uses a single pressure value to measure the absolute pressure in the fuel tank (100), there is no need for the pressure access lumen (310; FIG. 5).

A constant fuel pressure may also be produced using the setup illustrated in FIG. 6 by pressurizing the fuel (600) contained within the internal cavity of the pressure tank (100) with a high vapor pressure fuel. High vapor pressure fuels such as ethane, propane, iso-butane, and butane are liquid above certain pressures. According to one embodiment, described with reference to FIG. 6, the fuel (600) is supplied in the pressurized fuel tank (100) as a liquid. When the valve (420) is depressed and the fuel is permitted to escape, the absolute pressure transducer (650) will sense a somewhat constant pressure as illustrated in FIG. 8B until no free liquid fuel exists. Once the free liquid fuel has been converted to gas and has escaped, the absolute internal pressure within the pressurized fuel tank will begin to drop until the internal pressure reaches atmospheric pressure. The absolute pressure transducer is able to sense the drop in pressure and may relate the drop in pressure to an associated fuel level. This fuel level may then be communicated to the user.

Figure 7:
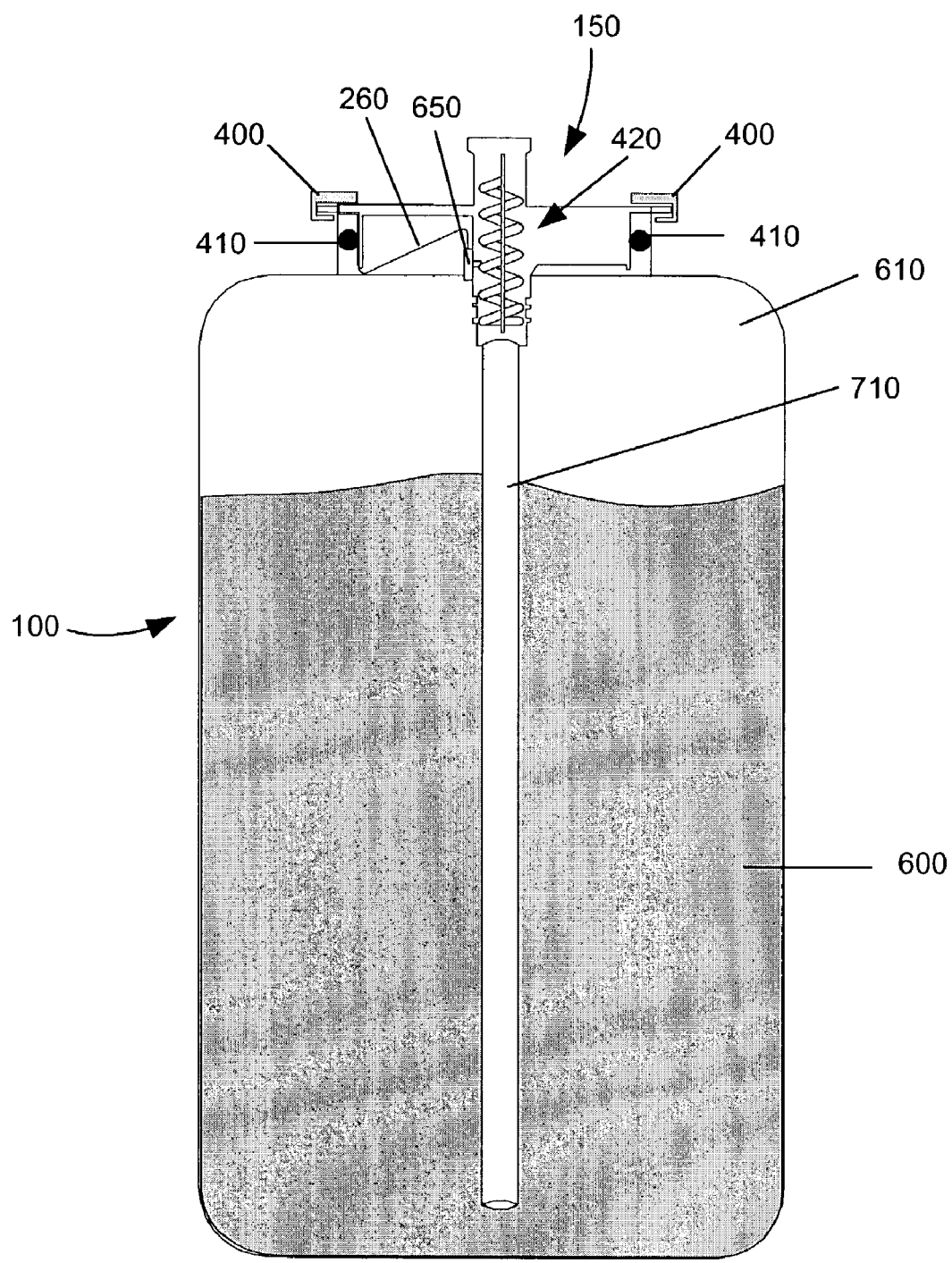
FIGS. 7 and 7A illustrate a hydrocarbon fuel supply connection and monitor unit connected to another alternative fuel supply according to one exemplary embodiment.
Figure 7A:
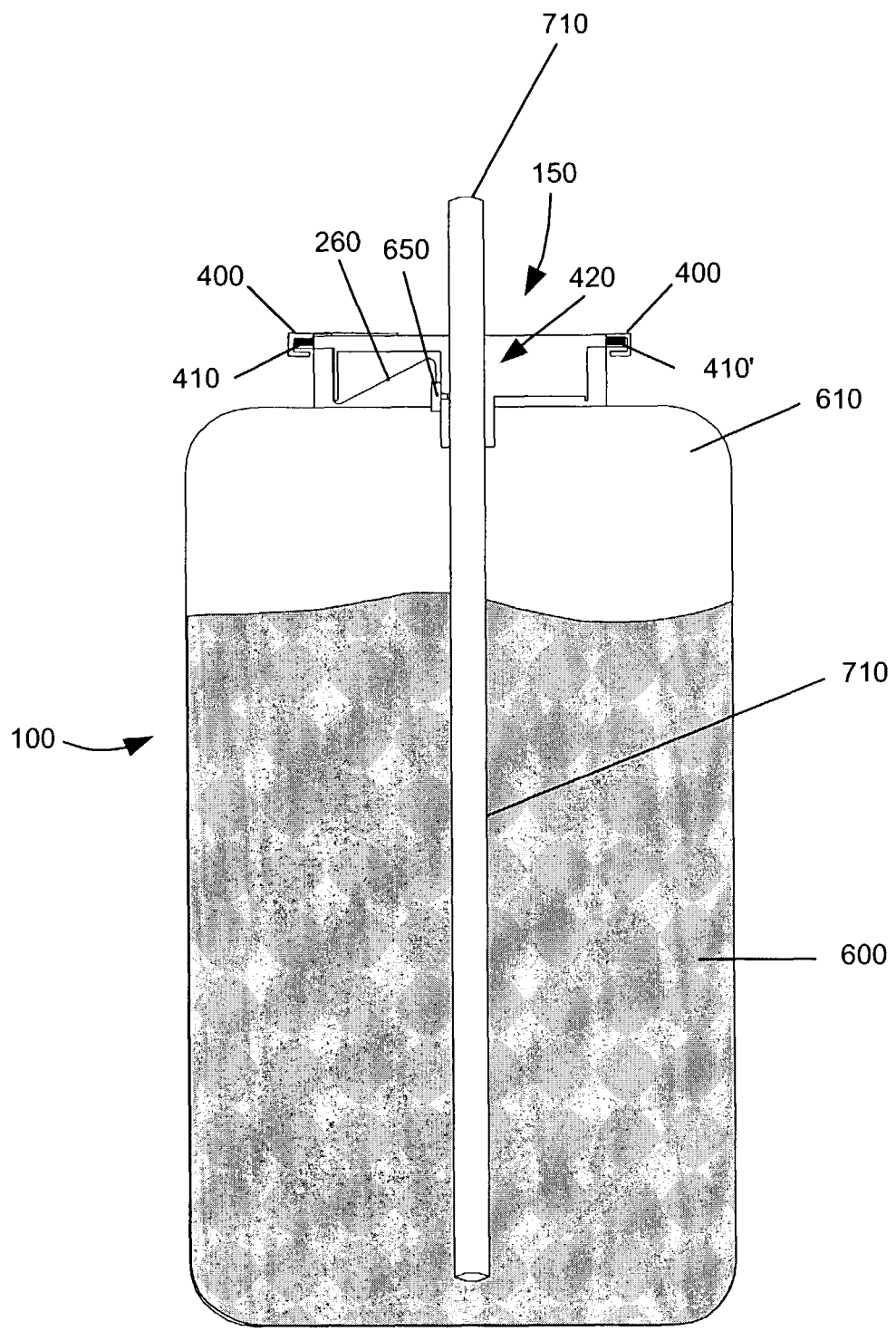

FIG. 7 illustrates an alternative embodiment of the incorporation of the pressure sensing apparatus. As illustrated in FIG. 7, the present fuel supply connection and monitoring unit (150) may be incorporated with a fuel supply that utilizes a dip-tube (710). The fuel supply connection and monitoring unit (150) may be manufactured as indicated above and in FIG. 7 with a dip tube (710) extending from the keel. Alternatively, the fuel supply connection and monitoring unit (150) may be made of metal, with the crimp ring (400) built into it as illustrated in FIG. 7A. The plastic nozzle and keel may then be inserted into and extend through the metal fuel connection and monitoring unit (150) typical of such pressurized canisters as standard spray paint canisters. Additionally, the plastic insert may have a valve built into it, such that when the valve is depressed, the valve is opened and fuel is allowed to escape into a fuel requiring system. The present fuel supply connection and monitoring unit (150) and associated sensor (650) may be incorporated and practiced with any number of fuel supply configurations. FIG. 7A also illustrates how a square cross-section type gasket (410') may be incorporated into a fuel supply connection and monitoring unit (150).

Figure 9:
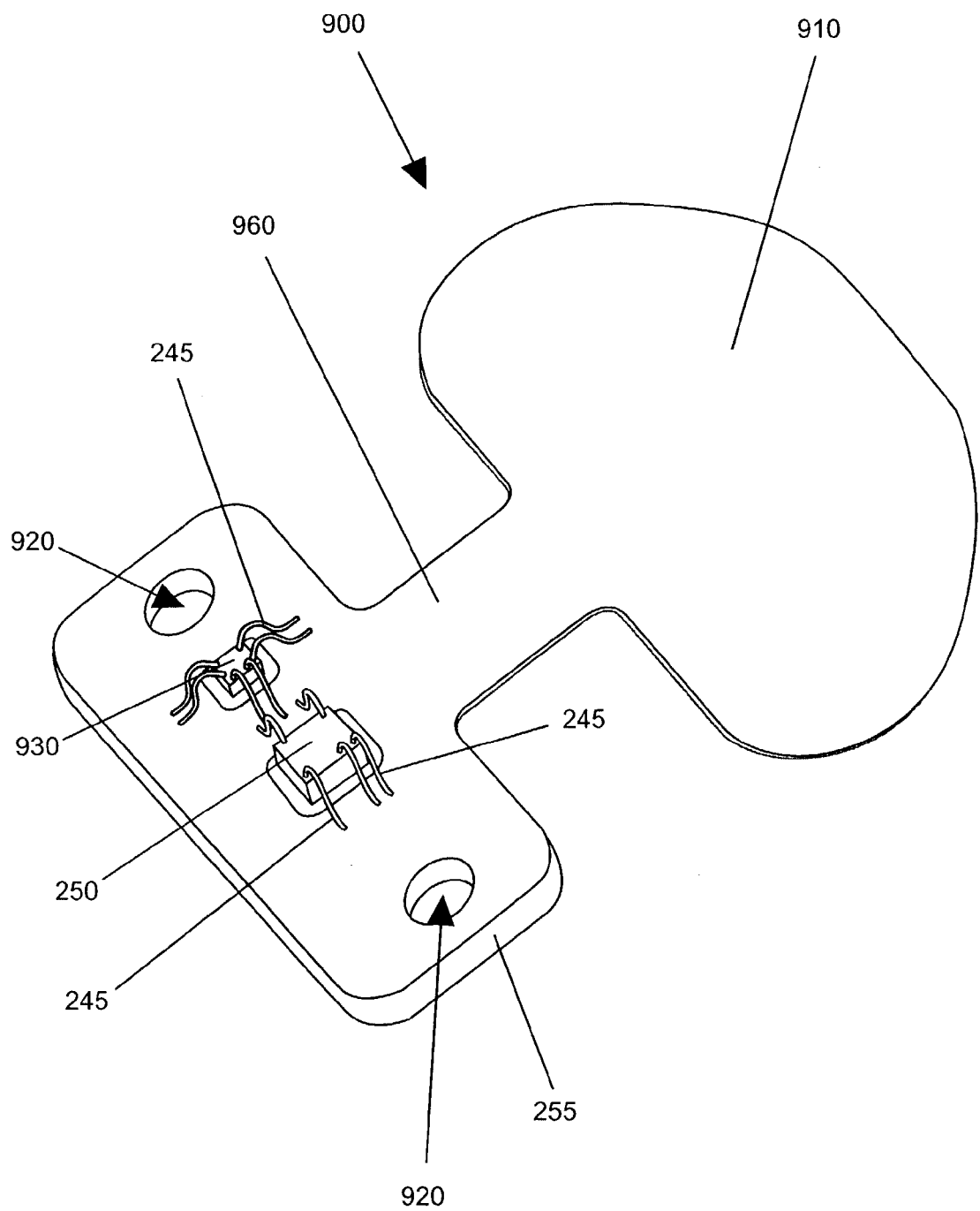
FIG. 9 illustrates a remote transmitting unit according to one exemplary embodiment.

FIG. 9 illustrates an alternative embodiment of the pressure sensing apparatus (900). As illustrated in FIG. 9, the pressure sensing apparatus (900) may be a remote unit that transmits the collected pressure data using radio frequency (RF) signals. An RF transmitting embodiment of the pressure sensing apparatus (900) includes a pressure sensor (250) coupled to a rigid substrate (255). The pressure sensor (250) is also communicatively coupled to a flexible circuit (960) through wire bonds (245) as explained above. The RF transmitting embodiment of the pressure sensing apparatus (900) also includes a memory (930) that contains instructions thereon, which when accessed, are configured to convert the signals it receives from the pressure sensor (250) and transmitting them as RF signals. The RF signals are then transmitted from the memory (930) to an antenna (910) that subsequently transmits the RF signals to an RF receiver (not shown) that is communicatively coupled to a host processing device (1100; FIG. 11). The computing device may then convert the RF signals into a representation of the remaining fuel level to be presented to the user. The power to operate the pressure sensor (250) as well as the memory (930) of the RF transmitting embodiment may be provided by the RF coupling between the pressure sensing apparatus (900) and the RF receiver (not shown).

Figure 10:
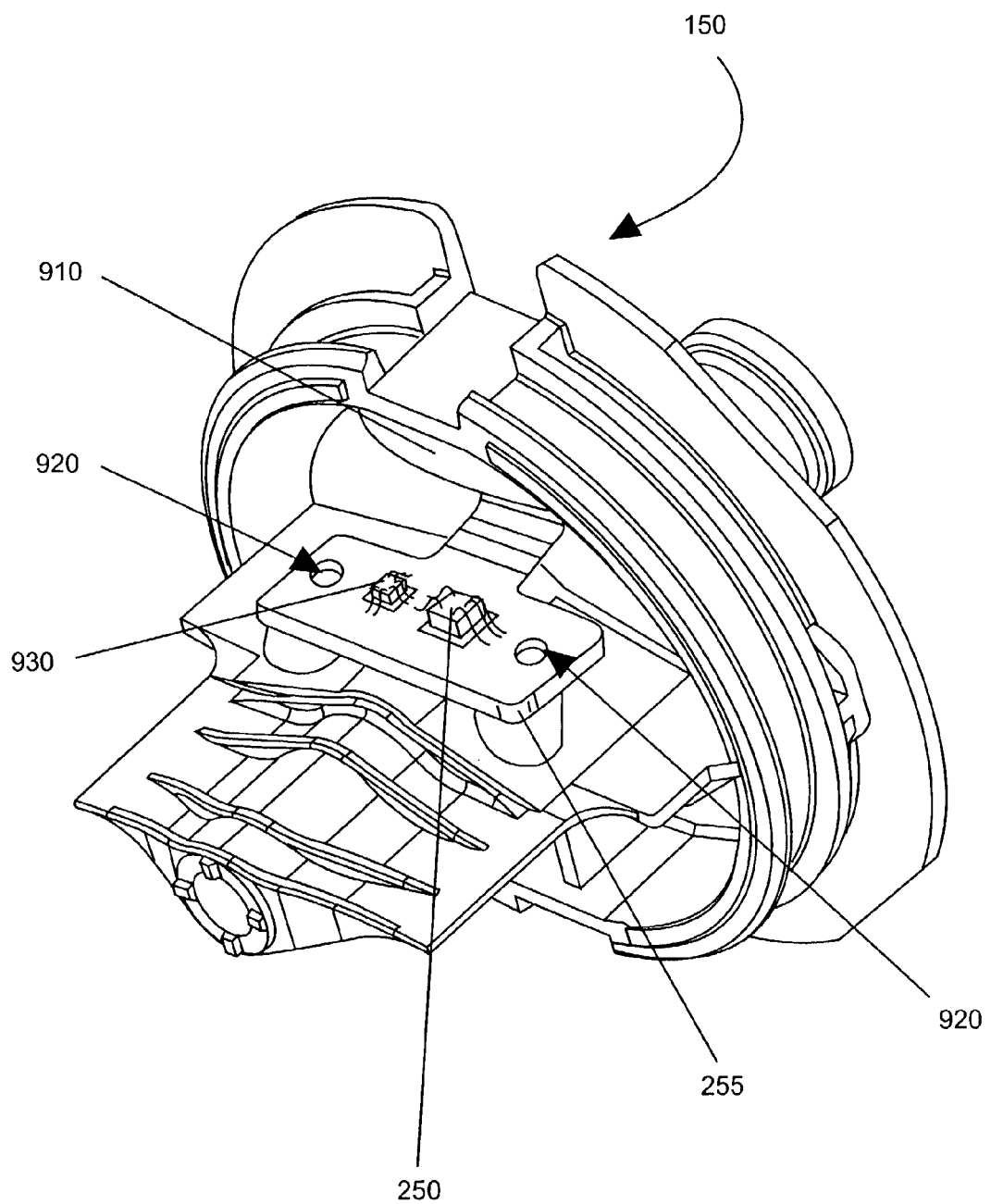
FIG. 10 illustrates the implementation of a remote transmitting unit on a hydrocarbon fuel supply connection and monitor unit according to one exemplary embodiment.

The RF transmitting embodiment of the pressure sensing apparatus (900) may be coupled to the fuel supply connection and monitoring unit (150) as illustrated in FIG. 10. Preferably the rigid substrate (255) is coupled to the body of the fuel supply connection and monitoring unit (150) by securing a fastener through the fastening orifices (920) and into the body of the fuel supply connection and monitoring unit (150). The antenna (910) portion of the pressure sensing apparatus (900) may then extend toward the top of the fuel supply connection and monitoring unit (150). According to this embodiment, the pressure sensing apparatus and its associated signal transmitting components are completely housed within the fuel supply connection and monitoring unit (150). By eliminating the need to run electrical signals to the top surface of the fuel supply connection and monitoring unit (150), the fluid seal between the fuel supply connection and monitoring unit (150) and the pressurized fuel tank (100) may be more secure and the possibility of tampering with the pressure sensing unit (900) is reduced.

It is also possible that the antenna (910) portion of the remote pressure sensing unit (900) be located outside of the pressurized fuel tank (100) allowing the RF controller's antenna (not shown) to be located closer to the transmitting antenna and thereby increasing the inductive coupling between the two antenna.

In conclusion, the fuel system described herein, in its various embodiments, simultaneously increases the predictability of the fuel level in a fuel supply while preserving safety features. Specifically, the fuel system described provides an apparatus for integrally connecting a fuel supply container to a fuel level sensor. By integrating the fuel supply container and a fuel level sensor, a user may readily be informed of the fuel level remaining in a fuel cell while maintaining the fluid integrity of the system.

The preceding description has been presented only to illustrate and describe embodiments of invention. It is not intended to be exhaustive or to limit the invention to any precise form disclosed. Many modifications and variations are possible in light of the above teaching. It is intended that the scope of the invention be defined by the following claims.

What is claimed is:

1. A fuel supply comprising:
   a fuel container having an interior chamber for containing fuel;
   a pressure sensing unit disposed within said interior chamber, wherein said pressure sensing unit is configured to provide an output signal indicative of an amount of fuel remaining in said fuel container;
   a fuel bag to contain said fuel disposed within said fuel container, wherein said fuel bag is fluidly coupled to a system coupling device;
   a pressurized inert propellant to provide pressure to said fuel, said inert propellant filling an area between said fuel bag and said fuel container; and
   a pressure access lumen situated in said system coupling device, wherein said pressure access lumen provides pressure from said fuel to said pressure sensing unit;
   wherein said pressure sensing unit comprises a differential pressure transducer configured to sense a differential pressure between a pressure of said fuel and a pressure of said pressurized inert propellant.

2. A fuel supply comprising:
   a fuel container having an interior chamber for containing fuel; and
   a pressure sensing unit disposed within said interior chamber;
   wherein said pressure sensing unit is configured to provide an output signal indicative of an amount of fuel remaining in said fuel container;
   wherein said fuel further comprises:
   a fuel disposed within said interior chamber of said fuel container; and
   an inert propellant also disposed within said interior chamber of said fuel container to pressurize said fuel;
   wherein said pressure sensing unit comprises an absolute pressure transducer configured to sense an absolute pressure of said fuel.

3. The fuel supply of claim 2, further comprising a fuel bag containing said fuel in said interior chamber, said inert propellant being disposed outside said fuel bag.

4. A fuel gauge comprising:
   a fuel container configured to contain both a quantity of fuel and a quantity of an inert propellant for pressurizing said fuel, wherein a pressure of said propellant is sufficient to drive said fuel from said fuel container;
   a pressure sensor disposed within said fuel container, wherein said pressure sensor is configured to provide an output signal indicative of an amount of fuel remaining in said fuel container, said pressure sensor being a differential pressure sensor sensing a difference in pressure between said fuel and said inert propellant; and
   a computing device communicatively coupled to said pressure sensor, wherein said computing device is configured to convert said output signal of said pressure sensor into a user readable representation of the amount of fuel remaining in said fuel container;
   wherein said pressure sensor further comprises:
   a rigid substrate;
   a pressure transducer coupled to said rigid substrate;
   a flexible circuit communicatively coupled to said pressure transducer; and
   a communications path communicatively coupled to said flexible circuit, wherein said communications path is configured to transmit said output signal to said computing device.

5. A fuel cell system comprising:
   a fuel cell;
   a fuel source;
   a fuel flow path fluidly coupling said fuel cell and said fuel source;
   a fuel level sensing device disposed within said fuel source wherein said fuel level sensing device includes a pressure sensing unit that is configured to provide an output signal indicative of an amount of a fuel remaining in said fuel source; and
   a communications path communicatively for transmitting said output signal to a computing device;
   wherein said communications path further comprises a radio frequency transmitter completely disposed within said fuel source; and the radio frequency transmitter transmits pressure temperature compensate data to a remote location.

6. A fuel cell system comprising:
   a fuel cell;
   a fuel source configured to contain fuel;
   a fuel flow path fluidly coupling said fuel cell and said fuel source;
   a fuel level sensing device disposed within said fuel source wherein said fuel level sensing device includes a pressure sensing unit that is configured to provide an output signal indicative of an amount of a fuel remaining in said fuel source;
   a fuel disposed within said fuel source; and
   an inert propellant also disposed within fuel source to pressurize said fuel.

7. The fuel cell system of claim 6, wherein said pressure sensing unit comprises an absolute pressure transducer configured to sense an absolute pressure of said fuel.

8. The fuel cell system of claim 6, further comprising a fuel bag containing said fuel in said fuel source, said inert propellant being disposed outside said fuel bag.

9. A fuel supply comprising:
   fuel containing means defining an interior chamber configured for containing fuel;

pressure sensing means disposed within said interior chamber of said fuel containing means;

a fuel bag to contain said fuel disposed within said fuel containing means, wherein said fuel bag is fluidly coupled to a system coupling means;

a pressurized inert propellant to provide pressure to said fuel, said inert propellant filling an area between said fuel bag and an interior wall of said fuel containing means; and a pressure access lumen situated in said system coupling means, wherein said pressure access lumen provides pressure from said fuel to said pressure sensing means wherein said pressure sensing means is configured to provide an output signal indicative of an amount of fuel remaining in said fuel containing means.

10. The fuel supply of claim 9, wherein said pressure sensing means further comprises:

conductive leads communicatively coupled to a pressure transducer; and conductive contacts communicatively coupled to said conductive leads, wherein said conductive contacts are located outside of said fuel containing means.

11. The fuel supply of claim 9, wherein said pressure sensing means further comprises a radio frequency transmitter completely disposed within said interior chamber of said fuel containing means.

12. A method of sensing the fuel level in a pressurized fuel container of a fuel cell system comprising:

providing fuel from a fuel container to a fuel cell, said fuel container containing both a quantity of fuel and a separate fuel inert propellant;

measuring the differential pressure directly inside said fuel container between said fuel and said fuel inert propellant; and comparing said pressure to a known pressure/volume characteristic to determine a volume of fuel contained in said fuel container, and outputting an indication of said volume of fuel contained in said fuel container.

13. The method of claim 12, wherein measuring the pressure directly inside a fuel container further comprises:

disposing a pressure sensing device within said fuel container, wherein said pressure sensing device is configured to transmit an output signal indicative of an amount of fuel remaining in said fuel container; and transmitting said output signal from said pressure sensing device to a computing device.

14. A fuel supply comprising:

a fuel container having an interior chamber for containing fuel;

a pressure sensing unit comprising a pressure sensor disposed within said interior chamber; and a memory unit disposed on said pressure sensing unit and configured to store data for said pressure sensing unit;

wherein said pressure sensing unit is configured to provide an output signal indicative of an amount of fuel remaining in said fuel container;

wherein said memory unit stores pressure data collected by said pressure sensing unit; and wherein said memory unit is configured to output said pressure data when said fuel container is moved from a first host system to a second host system; and where pressure data including temperature compensate data.

15. The fuel supply of claim 14, further comprising:

a communications path for transmitting said output signal, said communications path comprising a radio frequency transmitter;

wherein said radio frequency transmitter is at least partially disposed within said interior chamber of said fuel container.

16. A fuel supply comprising:

a fuel container having an interior chamber for containing fuel;

a pressure sensing unit comprising a pressure transducer disposed within said interior chamber, wherein said pressure sensing unit is configured to provide an output signal indicative of an amount of fuel remaining in said fuel container via a communications path;

wherein said communications path comprises:

conductive leads communicatively coupled to said pressure transducer; and conductive contacts communicatively coupled to said conductive leads, wherein said conductive contacts comprise conductive pads located outside of said fuel container and disposed on said pressure sensing unit such that said conductive contacts interface said pressure sensing unit with a host device when said fuel supply is installed in said host device; and a memory unit connected to said pressure sensing unit and configured to store data for said pressure sensing unit; and where pressure data including temperature compensate data.

17. The fuel supply of claim 16, wherein said memory unit is configured to output said data when said pressure sensing unit is moved from a first host system to a second host system.

18. The fuel supply of claim 16, wherein said pressure transducer comprises a differential pressure transducer.

19. The fuel supply of claim 16, wherein said pressure transducer comprises an absolute pressure transducer.

20. A fuel supply comprising:

a fuel container having an interior chamber for containing fuel;

a pressure sensing unit comprising a pressure sensor disposed within said interior chamber; and a memory unit disposed on said pressure sensing unit and configured to store data for said pressure sensing unit;

wherein said pressure sensing unit is configured to provide an output signal indicative of an amount of fuel remaining in said fuel container;

wherein said memory unit is integrated with said pressure sensing unit such that said pressure sensing unit and memory unit can be moved between different fuel containers as a single unit; and where pressure data including temperature compensate data.

21. The fuel supply of claim 20, wherein said pressure sensing unit comprises an absolute pressure transducer configured to sense an absolute pressure of said fuel.

22. The fuel supply of claim 20, further comprising a computing device communicatively coupled to said pressure sensing unit, wherein said computing device converts said output signal of said pressure sensing unit into a user readable representation of an amount of fuel remaining in said fuel container based on said output signal.

23. The fuel supply of claim 20, wherein said memory unit stores pressure/volume characteristics for said fuel container.

24. The fuel supply of claim 20, wherein said memory unit stores calibration data for said pressure sensing unit.

25. The fuel supply of claim 20, wherein said memory unit stores freshness date information for fuel in said fuel supply.

26. The fuel supply of claim 20, wherein said memory unit stores temperature compensation values.

27. The fuel supply of claim 20, wherein said memory unit stores warranty data.

28. A fuel cell system comprising:
a fuel cell;
a fuel source;
a fuel flow path fluidly coupling said fuel cell and said fuel source;
a fuel level sensing device disposed within said fuel source wherein said fuel level sensing device includes a pressure sensing unit that is configured to provide an output signal indicative of an amount of a fuel remaining in said fuel source; and
a fuel bag to contain a fuel disposed within said fuel source, wherein said fuel bag is fluidly coupled to said fuel flow path;
a pressurized propellant to provide pressure to said fuel, wherein said pressurized propellant occupies an area between said fuel bag and an interior wall of said fuel source; and
a pressure access lumen situated in said fuel flow path, wherein said pressure access lumen provides pressure from said fuel to said pressure sensing unit.

29. The fuel cell system of claim 28, wherein said pressure sensing unit comprises a differential pressure transducer configured to sense a differential pressure between a pressure of said fuel and a pressure of said pressurized propellant.

* * * * *